United States Patent
Tiedemann et al.

(10) Patent No.: US 10,786,111 B2
(45) Date of Patent: Sep. 29, 2020

(54) DRINKS PREPARATION MACHINE

(71) Applicant: Qbo Coffee GmbH, Wallisellen (CH)

(72) Inventors: Thorsten Tiedemann, Rellingen (DE); Rüdiger Ternité, Hamburg (DE)

(73) Assignee: QBO COFFEE GMBH, Wallisellen (CH)

( * ) Notice: Subject to any disclaimer, the term of this patent is extended or adjusted under 35 U.S.C. 154(b) by 283 days.

(21) Appl. No.: 15/742,130

(22) PCT Filed: Jul. 7, 2016

(86) PCT No.: PCT/EP2016/066069
§ 371 (c)(1),
(2) Date: Jan. 5, 2018

(87) PCT Pub. No.: WO2017/005831
PCT Pub. Date: Jan. 12, 2017

(65) Prior Publication Data
US 2018/0199755 A1   Jul. 19, 2018

(30) Foreign Application Priority Data

Jul. 9, 2015 (EP) .................................... 15176167

(51) Int. Cl.
*A47J 31/54* (2006.01)
*A47J 31/56* (2006.01)
(Continued)

(52) U.S. Cl.
CPC .......... *A47J 31/545* (2013.01); *A47J 31/002* (2013.01); *A47J 31/542* (2013.01); *A47J 31/56* (2013.01); *A47J 31/465* (2013.01)

(58) Field of Classification Search
None
See application file for complete search history.

(56) References Cited

U.S. PATENT DOCUMENTS

| 2,895,402 A * | 7/1959 | Totten ................... G07F 13/065 99/289 R |
| 4,745,852 A * | 5/1988 | Sager .................... A47J 31/402 99/280 |

(Continued)

FOREIGN PATENT DOCUMENTS

| CN | 201230839 | 5/2009 |
| EP | 0 935 938 | 8/1999 |

(Continued)

OTHER PUBLICATIONS

English translation of Chinese Office Action dated Oct. 16, 2019, Application No. 201680039188.8, 11 pages.

(Continued)

*Primary Examiner* — Jacob J Cigna
(74) *Attorney, Agent, or Firm* — Rankin, Hill & Clark LLP

(57) ABSTRACT

A drinks preparation machine for preparing brewed drinks from a portion package with an extraction material includes a water tank, a pump, a water heater and a brewing chamber for receiving the portion package. The pump delivers water from the water tank into the brewing chamber via the water heater. A temperature sensor measures a temperature along the fluid path including an initial temperature at the location of the temperature sensor at least in one operating condition after a switching-on procedure or waking-up procedure and before a possible heating-up procedure of the water heater, and, after the water heater has reached an operating temperature, to carry out a rinsing procedure of the brewing chamber with water from the water heater, when and only when the measured initial temperature corresponds to a certain condition, and only subsequently to effect an introduction of the portion package into the brewing chamber.

15 Claims, 3 Drawing Sheets

(51) Int. Cl.
*A47J 31/00* (2006.01)
*A47J 31/46* (2006.01)

(56) References Cited

U.S. PATENT DOCUMENTS

| | | | | |
|---|---|---|---|---|
| 5,393,540 | A * | 2/1995 | Bunn | A47J 31/002 426/231 |
| 5,943,944 | A * | 8/1999 | Lassota | A47J 31/007 99/280 |
| 7,814,824 | B2 * | 10/2010 | Beretta | A47J 31/56 99/282 |
| 2006/0096465 | A1 | 5/2006 | Hu et al. | |
| 2008/0017041 | A1 * | 1/2008 | Beretta | A47J 31/46 99/279 |
| 2008/0095903 | A1 * | 4/2008 | Weijers | A47J 31/0647 426/431 |
| 2010/0018402 | A1 | 1/2010 | Liu | |
| 2010/0018407 | A1 * | 1/2010 | Liu | A47J 31/465 99/302 R |
| 2012/0156337 | A1 * | 6/2012 | Studor | A47J 31/525 426/231 |
| 2013/0263745 | A1 * | 10/2013 | Bombeck | A47J 31/24 99/293 |
| 2013/0298776 | A1 * | 11/2013 | Mulder | A47J 31/5253 99/283 |
| 2015/0201796 | A1 * | 7/2015 | Kuempel | A47J 31/5255 426/231 |
| 2017/0172340 | A1 * | 6/2017 | Baarman | A47J 31/52 |

FOREIGN PATENT DOCUMENTS

| | | |
|---|---|---|
| JP | 6-96354 | 4/1994 |
| JP | 2013-543783 | 12/2013 |
| WO | 2010/118543 | 10/2010 |
| WO | 2014/195842 | 12/2014 |

OTHER PUBLICATIONS

International Preliminary Report on Patentability dated Jan. 9, 2018 (Jan. 9, 2018), Application No. PCT/EP2016/066069, 5 pages.

* cited by examiner

DRINKS PREPARATION MACHINE

BACKGROUND OF THE INVENTION

Field of the Invention

The invention relates to drinks preparation machines for preparing drinks or the like from a portion package with a portion packaging (for example capsule) and with an extraction material (for example coffee) which is contained in the portion package. In particular, it relates to a drinks preparation machine and to a method for operating a drinks preparation machine.

Description of Related Art

Drinks preparation machines for preparing drinks or the like from an extraction material, which is present in a portion package are known, for example, as coffee machines or espresso machines. In many corresponding systems, the portion packaging is designed as capsules, in which the extraction material is sealed, for example in an airtight manner. For extraction, the capsule is pierced, for example at two sides which are opposite to one another. An extraction fluid—generally hot water—is then introduced at the first side. The extraction product is discharged from the capsule at the second side. This takes place in a so-called brewing module. Such a module includes a brewing chamber, in which the capsule is received for the brewing process. Apart from capsules, so-called pods, with regard to which the portion packaging consists of water-permeable filter paper and which do not therefore necessarily have to be pieced, are also known.

Drinks preparation machines of the type discussed here, apart from a water tank and a pump, include a water heating means (continuous heater or possibly boiler). The water gets from the water heating means into the brewing chamber where the brewing process takes place.

The quality of the brewed drink which is produced in the brewing process is critically dependent on the brewing temperature. The temperature at the outlet side of the water heating means can be precisely regulated for this purpose. Despite this, fluctuating brewing temperatures and consequently a fluctuating quality of the brewed drink have been observed in practise. An important reason for this may lie in the following problem: The elements of the brewing chamber are cooled down if the machine has not been used for some time. If a drink, in particular a drink with a small volume (for example espresso or ristretto) is then brewed, the drink then consequently also cools down somewhat on the path through the brewing chamber.

Against this background, EP 0 935 938 teaches an espresso machine with an electrical heating element and with a control loop in order to regulate (closed-loop control) the temperature in the heating element. It is suggested to render the desired temperature of the heating element dependent on the outlet temperature of the heating element (thermoblock), in order to prevent a cooling of the drink to below a desired drink temperature in the case of brewing for the first time after switching on the espresso machine. For example, if the outlet temperature corresponds to the room temperature, then the desired temperature can be approx. 10° higher than if the heating element was already hot, so that the drink finally has the same temperature. However, this solution entails the temperature of the water not always being the same on first contact with the extraction material (coffee powder), which has an influence on the drinks characteristics such as an aroma. This can be disadvantageous given aroma characteristics which are directed to the brewing temperature, and the outlined problem of the fluctuating drink quality is not therefore solved.

WO 2014/195842 relates to a coffee machine, concerning which the flow rate through a continuous heater is regulated in dependence on its temperature such that the temperature at its outlet side corresponds to a predefined value. However, this does not represent a solution to the initially outlined problems.

SUMMARY OF THE INVENTION

It is an object of the invention to provide a drinks preparation machine which overcomes disadvantages of the state of the art and which, in particular, ensures an as constant as possible brewing temperature and drinks temperature, independently of prior conditions. The drinks preparation machine should preferably permit the conservation of resources as much as possible and should not be an obstacle to a solution that is comfortable for the user in operation and handling.

According to an aspect of the invention, a drinks preparation machine is provided for preparing brewed drinks form a portion package with an extraction material that is present in a portion packaging. The drinks preparation machine includes a water tank, a pump, a water heater and a brewing chamber for receiving the portion package, wherein the pump is configured to deliver water over a fluid path from the water tank into the brewing chamber via the water heating means. It is characterised by at least one temperature sensor for measuring a temperature along the fluid path (at the location of the fluid heating means or a location arranged downstream of this), as well as characterised in that it is configured to measure an initial temperature at the location of the temperature sensor at least in one operating condition (for example adjustable operating condition or one assumed on each operation) after a switching-on procedure or waking-up procedure and before a possible heating procedure of the water heating means, and, after the water heater has reached an operating temperature, to carry out a rinsing procedure of the brewing chamber with water from the water heater, and specifically when and only when the measured initial temperature corresponds to a certain condition. An introduction of the portion package into the brewing chamber is not effected until subsequent to such a possible rinsing procedure.

The condition, to which the initial temperature must correspond so that a rinsing procedure is carried out, can in particular be the falling-short of a fixed threshold value. It has been found that a threshold value of between 25° and 85° or between 30° and 60° C., in particular between 35° C. and 50° C. is useful for this purpose. The optimal threshold depends on the circumstances, for example the total thermal capacity of the—water-filled—water heater in comparison to the total thermal capacity of the brewing chamber parts, on the respective thermal conductivity characteristics etc. It can also be determined for a certain type of drinks preparation machine by way of numerical computations and/or experimentally and then be set in the drinks preparation machine by the software or possibly even hardware (for example in the form of a bimetallic strip). One does not rule it being able to be influenced by the user or by service personnel.

Other conditions are also conceivable instead of a fixed threshold value, for example a threshold value that is dependent on circumstances (for example on a preset fluid quantity), wherein given small preset fluid quantities, a rinsing is carried out already at higher temperatures than at lower temperatures.

The drinks preparation machine can be configured to carry out the rinsing procedure that is dependent on the initial temperature, after each wake-up procedure (and possibly switching-on procedure), or if the machine is in an operating condition that is selectable by the user (for example "automatic standby" or "espresso/ristretto", etc.).

A waking-up procedure in particular can include a waking-up from a standby-mode, in which no energy is fed to the water heating means. Here, the course of action can be provided with a rinsing procedure that is carried out or not carried out depending on the measured initial temperature, only after a waking-up procedure (from the standby mode) or after a switching-on procedure and a waking-up procedure. In the first case (only after the waking-up procedure), one can for example envisage a rinsing procedure always being effected after a switching-on procedure, independently of the initial temperature.

The procedure according to the invention is coupled, for example, to an automatic stand-by operation, concerning which the drinks preparation machine goes over into standby mode after fulfilling a predefined condition, for example after a certain time interval without brewing, for example of one minute or a few minutes. The procedure according to the invention is indeed particularly advantageous in the context of such an automatic standby operation, as it can utilise the advantages of the standby mode with respect to the saving of energy, particularly if this mode is already assumed after a brief period, without significantly compromising the operating comfort and the quality of the drink.

A further energy saving effect of the procedure according to the invention is achieved by way of the rinsing procedure not taking place every time, but indeed only when the predefined condition is fulfilled, thus when it is estimated that the brewing chamber is not warm enough.

The introduction of the portion package into the brewing chamber can be effected, for example, by way of:
- a portion package that is held in an intermediate position—for example in a capsule recognition position—or possibly held in a store being transported into the brewing chamber, or a dropping of the portion package, which is held in the intermediate position, into the brewing chamber being made possible;
- the user being requested to now (if the measured initial temperature was below the threshold value, not until after the rinsing procedure, otherwise, for example, immediately after the switching-on or waking-up procedure or after the heating-up) insert a portion package;
- an insertion of the portion package being released, possibly coupled to a corresponding signal to be user, after it was previously prevented from doing so until the rinsing procedure is possibly completed, for example by way of a blocking of an insert opening.

The invention is based on the recognition that the fluctuating brewing temperatures and the unequal temperatures of the finished brewed drink particularly depend on whether the brewing chamber itself is still hot or not. If it has been some time since the last brewing process was carried out, then the brewing chamber under certain circumstances has already cooled down, and the first brewing leads to an unsatisfactory result. This circumstance can be dealt with by way of the time up to a transition into the standby mode being selected in an accordingly dependent manner (i.e. it takes roughly so long to switch into the standby mode as does the cooling of the brewing chamber last) and/or that the drinks preparation machine is programmed to carry out a short rinsing procedure with hot water after each switching-on procedure or waking-up procedure. The former however has the disadvantage of increased energy consumption, and the latter has the disadvantage that under certain circumstances, rinsing procedures have to be carried out practically before each brewing, particularly if the coffee machine rapidly goes over into the standby mode after use for energy-saving reasons. This is perceived by the consumer as being annoying and unnecessary.

A transition into a standby mode can be carried out in an arbitrarily rapid manner due to the fact that according to the invention, an initial temperature is measured, possibly before the heating up, and despite this, the preheating of the brewing chamber by way of the rinsing procedure can be effected according to requirements. Possible environmental influences—in particularly an ambient temperature—are taken into account without restraint.

In particular, the temperature sensor is attached in or on an element along the fluid path, and specifically either in or on the water heater or on an element that is arranged downstream of the water heating means, for example the fluid conduit to the brewing chamber or on an element of the brewing chamber itself. Under certain circumstances, it has been found to be particularly advantageous if the mentioned temperature sensor is attached in or on the water heater itself. This is firstly due to the fact that a temperature sensor is present there anyway in many cases and is used for the regulation of the water heating means, and thus no additional hardware effort is therefore needed. Secondly, a correlation exists between the temperature of the parts of the brewing chamber on the one hand and the temperature of the water heater on the other hand and therefore a measurement can be taken at the location of the water heater, where this is more simple than in the brewing chamber with movable parts that are partly prone to contamination, and has significance despite this. However, one does not rule out the temperature sensor being attached in direct contact with the brewing chamber—for example the injector, through which hot water is introduced into the portion package.

Likewise the subject-matter of the invention is a method for operating a drinks preparation machine, in particular of the type described above, with the following steps:
- measuring a temperature along the fluid path (in particular in or on the water heating means) as an initial temperature, subsequently to a signal for a waking-up from the standby mode or subsequently to switching on the drinks preparation machine, in particular by way of actuating a suitable operating element (button or the like) by the user,
- heating the water in the water heater up to an operating temperature after the measuring of the temperature,
- carrying out a rinsing of the brewing chamber with heated water from the water heater when and only when the initial temperature lies below a threshold valve; and
- introducing the portion package and brewing the drink to be brewed.

BRIEF DESCRIPTION OF THE DRAWINGS

Embodiment examples of the invention are hereinafter described by way of figures. In the figures, the same reference numerals indicate the same or analogous elements. There are shown in.

DETAILED DESCRIPTION OF THE INVENTION

Figure 1:
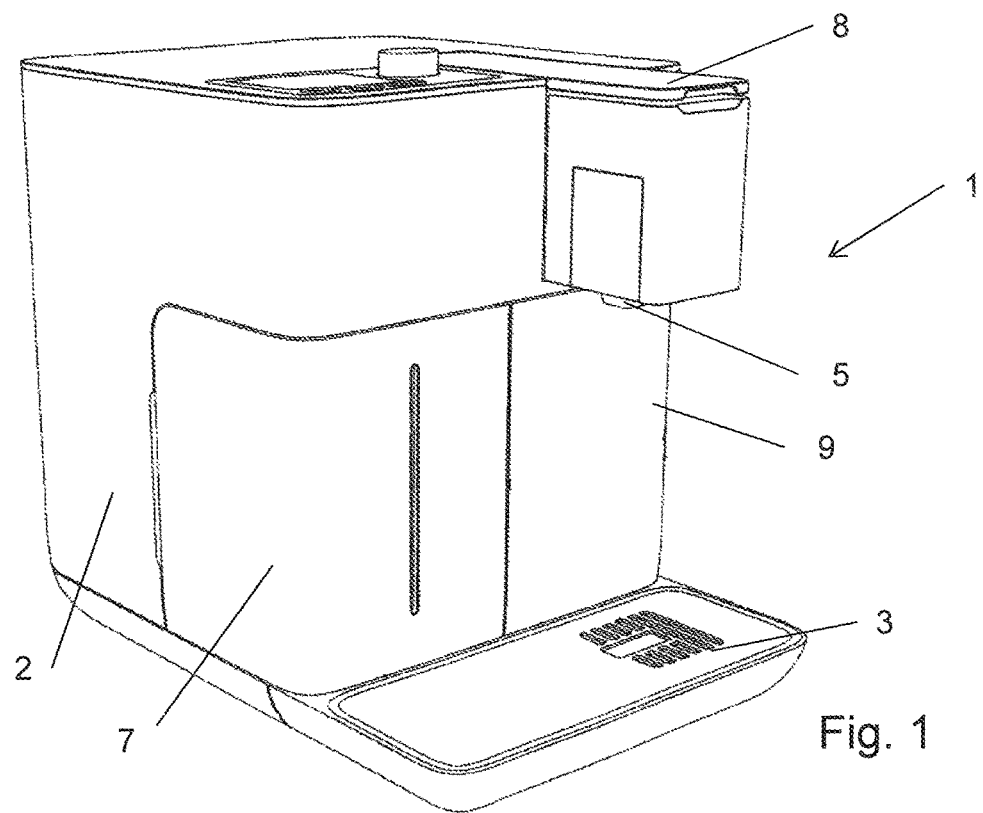
FIG. 1 is a view of a coffee machine as an example of a drinks preparation machine according to the invention.

The drinks preparation machine 1 according to FIG. 1 for example is a portion capsule coffee machine of the type known per se with a horizontal brewing module Apart from a housing 2, it includes a placement surface 3 for a drinks vessel, here with a drainage grating and a capture container for fluid drops which is located therebelow (covered in the figure). A drinks outlet 5 is located above the placement surface, through which drinks outlet a drink, for example coffee, gets into the drinks vessel. In the represented embodiment example, a water container 7 can be pulled away to the front for filling and cleaning. A capture container 9 for spent drinks capsules is located next to this. A capsule gets into this after it has got into the brewing chamber, which is arranged in the inside of the drinks preparation machine, for the brewing process, and drops downwards after the brewing process, as is known per se for drinks preparation machines with a horizontal brewing module.

An operating lever 8, by way of which the brewing chamber can be opened can also be seen in FIG. 1, wherein an insert opening for inserting the capsule into the brewing chamber or an intermediate position is covered straight away in the condition of the operating lever which is represented folded down in the figures.

Figure 2:
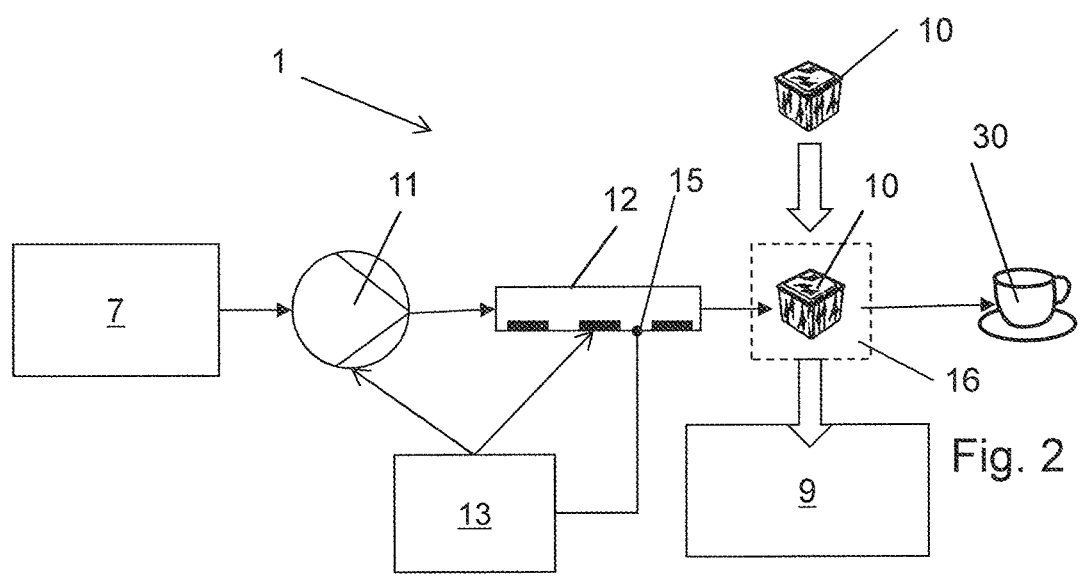
FIGS. 2-4 show, in each case, a schematic diagram of the coffee machine.

FIG. 2 shows a schematic diagram of such a drinks preparation machine 1. Apart from the water tank 7, this includes a pump 11 for feeding brewing water to the brewing chamber, and a water heater 12 (for example a continuous heater or a boiler). A control 13 is configured to activate the pump 11 and the water heater 12 in accordance with requirements, for which it is in contact with user input device (not shown). Moreover, additional elements, for example a flowmeter, can be provided along the fluid path in a manner known per se; and such a flowmeter is preferably arranged upstream of the water heating means.

A temperature sensor 15 is attached to the water heater (the temperature sensor can alternatively also include a probe which reaches into the inside of the water heater and which comes into direct contact with the water). The control 13 is configured to read out the temperature sensor. This is used, for example, to regulate the temperature of the water heater. The temperature sensor 15 is additionally used for the procedure according to the invention, as will yet be described hereinafter.

For normal operation, a portion capsule 10, in the drawn embodiment example according to WO 2010/118543, wherein the design of the capsule however has no influence on the procedure according to the invention, is inserted from above into the brewing chamber 16. One can envisage such an insertion firstly being effected into an intermediate position outside the brewing chamber, for example as described in the unpublished European patent application 14 195 680.5. A capsule recognition step can optionally be carried out in an intermediate position. The onward transfer of the capsule into the brewing chamber 16 is controlled by the machine in such a case. Supplementarily or alternatively, other means for influencing the point in time, at which the capsule gets into the brewing chamber, can be present. Such other means can include a blocking of the insert and/or a corresponding display for the user, possibly assisted by a colour coding.

Heated brewing water, which is delivered by the pump, flows through the capsule in the brewing chamber 16. A brewed drink that goes through the drinks outlet into a drinking vessel 30, which is placed therebelow on the placement surface, results due to an extraction process. The portion capsule is ejected downwards into the capture container 9 after the brewing process.

Figure 3:
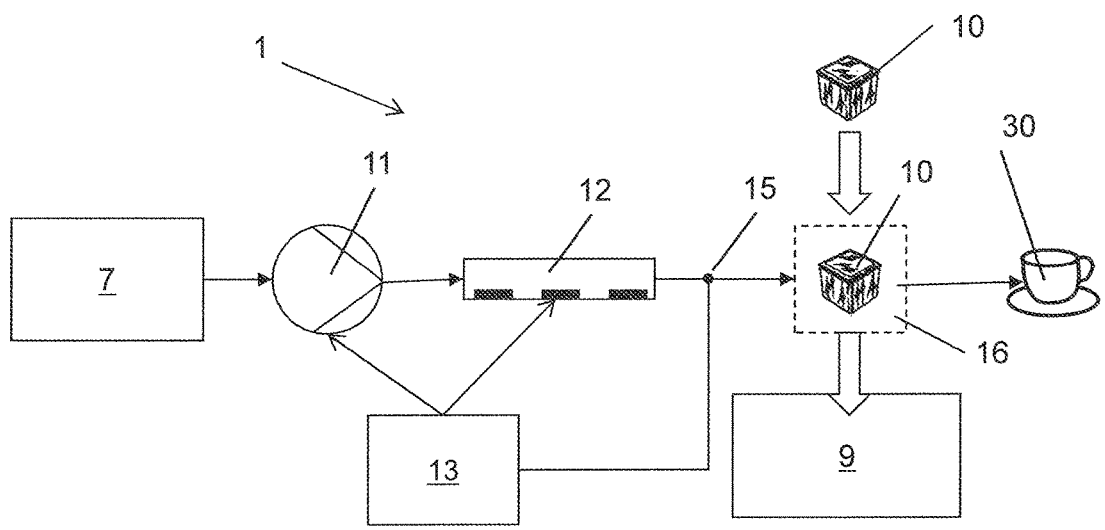

FIG. 3 shows a schematic diagram of a drinks preparation machine, concerning which the temperature sensor that is used for the procedure described herein is not arranged on or in the water heater 12, but on or in the fluid conduit, which is arranged downstream of the water heater.

Figure 4:
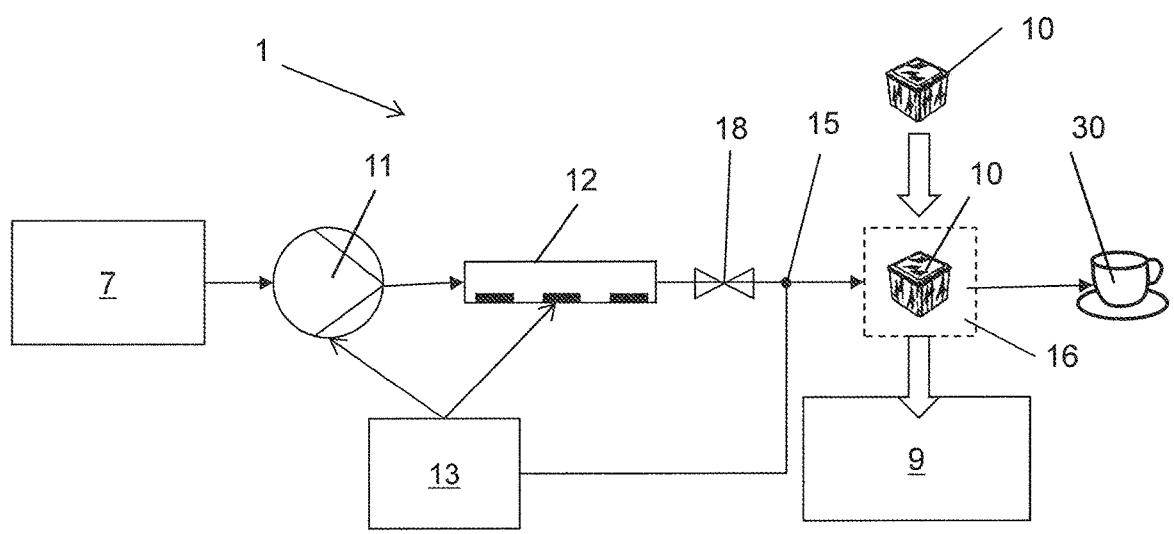

At least one valve 18 is often arranged between the water heater 12 on the one hand and the brewing chamber 16 on the other hand, in drinks preparation machines of the type described here, which is represented schematically by way of the embodiment according to FIG. 4. Such a valve 18 amongst other things can serve, for example, to selectively feed the heated water to the brewing chamber or to another fluid path, for example to a hot water connection of the drinks preparation machine, to a steam connection and/or to a cleaning path, for example for a milk module which is not described further here.

Such a valve 18 can have the effect of it acting in a thermally decoupling manner or—by way of it being able to dissipate heat—in a cooling manner. For such a case, it can be useful if, in embodiments, the temperature sensor 15 is arranged downstream of the water heater, which is likewise represented in FIG. 4.

Combinations are of course also possible. For example, a temperature sensor can be present in the water heater and/or on the water heater, as well as a temperature sensor can be present on or in the fluid path downstream of the water heating means, possibly downstream of a valve. The control can then be configured to take into account the reading of a certain one of the temperature sensors, to take into account a value that depends on a user setting, or to take into account a value that results by way of computation from a combination of different measured values.

Figure 5:
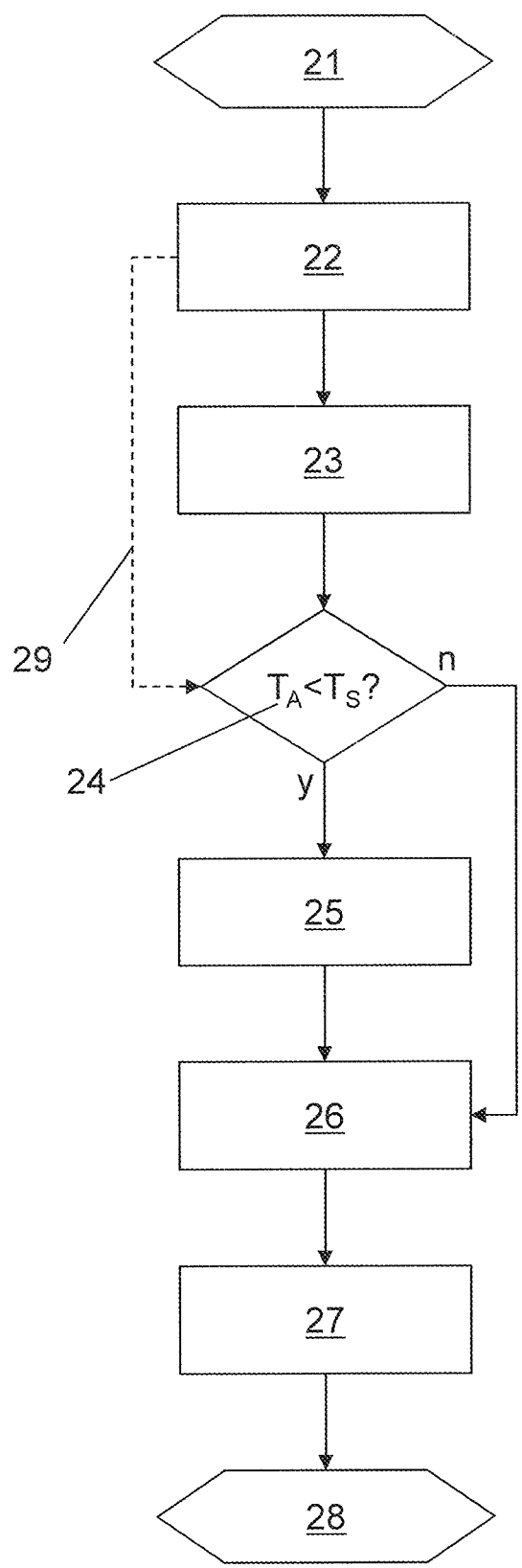
FIG. 5 is a flow diagram of the method, for whose execution the drinks preparation machine is carried out.

The drinks preparation machine is configured, after an initialization (in particular after a waking-up from a standby mode) to firstly measure a temperature by way of the temperature sensor 15, in order to estimate whether the brewing chamber is still sufficiently warm for a brewing process. FIG. 5 schematically shows the sequence of steps. A measurement 22 of the initial temperature $T_A$ is effected by the temperature sensor 15 after the initialization 21 (switching on or waking of the machine by the user). The water heater 12 is then heated up. A rinsing procedure 25 is subsequently carried out or not, depending on the previously measured initial temperature $T_A$, wherein the rinsing procedure is carried out if the initial temperature $T_A$ is smaller than a threshold value $T_S$ of for example 40° C. The reference numeral 24 in FIG. 5 indicates the branching point in the step sequence and the dashed arrow 29 illustrates that the value $T_A$, which is determined in the preceding step (measurement 22), goes into the comparison.

The insertion 26 of the portion package, in particular capsule, for example a coffee capsule is effected subsequently to the rinsing—if such has been carried out—or subsequently to the heating up. If the initial temperature lies above the threshold value, then the insertion of the portion package can already be effected simultaneously with the heating-up procedure. A brewing procedure 27 then takes place as is known per se, and the method subsequently finishes (completion 28), for example by way of ejecting the portion package into the capture container 9.

In addition, the drinks preparation machine can be configured to also carry out the described procedure (measuring, carrying out the rinsing in a manner depending on the reading) before a brewing process if it was not previously switched on or woken up.

The invention claimed is:

1. A drinks preparation machine for preparation of brewed drinks from an extraction material contained in a portion package, comprising:
    a water tank,
    a pump,
    a water heater,
    a temperature sensor, and
    a brewing chamber for receiving the portion package,
    wherein the pump is designed to deliver water by way of a fluid path from the water tank via the water heater into the brewing chamber,
    wherein the temperature sensor, is equipped and arranged to measure a temperature along the fluid path, and
    wherein the drinks preparation machine is designed and programmed to measure an initial temperature at the location of the temperature sensor at least in an operating condition after a switching-on procedure or wake-up procedure and before a possible heating procedure of the water heater, and is further programmed to carry out, after the water heater has reached an operating temperature, a rinsing procedure of the brewing chamber with water from the water heating means, wherein the machine is programmed to carry out the rinsing procedure if and only if the measured initial temperature fulfills a predefined condition, and wherein the machine is further configured to effect an introduction of the portion package into the brewing chamber only subsequently to the rinsing procedure.

2. The drinks preparation machine according to claim 1, wherein the temperature sensor is attached in or on the water heater.

3. The drinks preparation machine according to claim 1, wherein the temperature sensor is attached on a fluid conduit that is disposed downstream of the water heater.

4. The drinks preparation machine according to claim 1, further comprising a valve that is arranged between the water heater and the brewing chamber, wherein the temperature sensor is arranged downstream of the valve.

5. The drinks preparation machine according to claim 1, which is designed to automatically switch into a standby mode after a predefined or a specifiable time, in which standby mode the water heater is inactive, wherein the wake-up procedure is a wake-up procedure from the standby mode.

6. The drinks preparation machine according to claim 5, wherein the temperature sensor is attached on a fluid conduit that is disposed downstream of the water heater.

7. The drinks preparation machine according to claim 1, wherein the condition is a falling-short of a threshold value by the initial temperature.

8. The drinks preparation machine according to claim 7, wherein the temperature sensor is attached on a fluid conduit that is disposed downstream of the water heater.

9. The drinks preparation machine according to claim 7, wherein the threshold value is dependent on an operating condition.

10. The drinks preparation machine according to claim 9, wherein the temperature sensor is attached on a fluid conduit that is disposed downstream of the water heater.

11. The drinks preparation machine according to claim 7, wherein the threshold value is a predefined value between 35° C. and 50° C.

12. The drinks preparation machine according to claim 11, wherein the temperature sensor is attached on a fluid conduit that is disposed downstream of the water heater.

13. The drinks preparation machine according to claim 11, wherein the threshold value is dependent on an operating condition.

14. The drinks preparation machine according to claim 13, wherein the temperature sensor is attached on a fluid conduit that is disposed downstream of the water heater.

15. A method for operating a drinks preparation machine for preparing brewed drinks from an extraction material contained in a portion package, comprising a water tank, a pump, a water heater and a brewing chamber for receiving the portion package, wherein the pump is designed to deliver water by way of a fluid path from the water tank via the water heater into the brewing chamber, comprising the following steps:
    measuring a temperature along the fluid path as an initial temperature, subsequently to a waking-up from a standby mode or subsequently to the switching-on of the drinks preparation machine,
    heating the water in the water heater to an operating temperature, after the measuring of the temperature,
    carrying out a rinsing of the brewing chamber with heated water from the water heater if and only if the initial temperature lies below a threshold value, wherein during rinsing, no portion package is in the brewing chamber; and
    subsequently introducing the portion package and brewing the drink.

* * * * *